United States Patent [19]

Brokken-Zijp et al.

[11] Patent Number: 5,034,463

[45] Date of Patent: Jul. 23, 1991

[54] CONDUCTIVE POLYMER COMPOSITIONS

[75] Inventors: Josephina C. M. Brokken-Zijp; Leonard E. H. Gerards, both of Amsterdam, Netherlands; Michael Hanack, Tubingen, Fed. Rep. of Germany

[73] Assignee: Shell Oil Corporation, Houston, Tex.

[21] Appl. No.: 597,287

[22] Filed: Oct. 15, 1990

Related U.S. Application Data

[63] Continuation of Ser. No. 383,957, Jul. 21, 1989, abandoned, which is a continuation of Ser. No. 99,194, Sep. 21, 1987, abandoned.

[30] Foreign Application Priority Data

Sep. 22, 1986 [GB] United Kingdom ............... 8622752

[51] Int. Cl.$^5$ .................. C08L 79/04; H01B 1/12; C09B 47/04
[52] U.S. Cl. .................... 525/185; 525/186; 525/389; 252/518; 252/519; 528/9; 540/140
[58] Field of Search .................. 525/185, 186, 389; 252/518, 519

[56] References Cited

U.S. PATENT DOCUMENTS

| | | | |
|---|---|---|---|
| 2,643,984 | 6/1953 | Boyd ................... | 525/389 |
| 4,537,834 | 8/1985 | Achar et al. ............ | 525/186 |
| 4,563,300 | 1/1986 | Wynne et al. . | |
| 4,665,129 | 5/1987 | Naarmann et al. ........ | 525/186 |
| 4,670,511 | 6/1987 | Weddigen ............... | 525/138 |

FOREIGN PATENT DOCUMENTS 3245750 6/1984 Fed. Rep. of Germany .
3421993 10/1985 Fed. Rep. of Germany .
3422316 10/1985 Fed. Rep. of Germany .

OTHER PUBLICATIONS

Hanack et al., "Synthesis and Properties of Conducting Bridged Macrocyclic Metal Complexes", from Conductive Polymers (1986), pp. 133–204.

*Primary Examiner*—John C. Bleutge
*Assistant Examiner*—Vasu Jagannathan

[57] ABSTRACT

A process for preparing an electrically conductive polymer composition which comprises preparing a blend of a solution of an intrinsically conductive polymer and a thermosetting, thermoplastic or elastomeric polymer and removing the solvent, the intrinsically conductive polymer being employed in a weight ratio to the second polymer of from about 0.005:1 to 3:1, the solution having a solids content of from about 2 to 75 weight percent, and the intrinsically conductive polymer being an electrically conductive, stacked macrocyclic metal complex polymer based upon porphyrin or a derivative thereof which comprises an organic bridging ligand containing conjugated pi-electrons allowing delocalization along the polymer chain and in which the metal atom is Fe, R, Rh, Co, Mn or Cr.

11 Claims, No Drawings

CONDUCTIVE POLYMER COMPOSITIONS

This is a continuation of application Ser. No. 383,957, filed July 21, 1989 now abandoned which is a continuation of application Ser. No. 099,194, filed Sept. 21, 1987 now abandoned.

The present invention relates to electrically conductive polymer compositions.

Organic conductors recently have received much attention in the scientific literature. An interesting species of organic conductors is represented by macrocyclic metal complex polymers. Within this species, three different types of compounds have been defined by Hanack et al. in the textbook "Conductive Polymers" (Marcel Dekker, publishers; 1986): ladder polymers, plane polymers and compounds in which the macrocyclic structures are in linear, stacked arrangement. In its turn, the latter group of compounds is divided in two sub-groups: (a) stacked arrangements which are not or insufficiently conductive but which become so after doping and (b) stacked arrangements which per se are excellent conductors and therefore do not require doping. Examples of sub-group (a) are phthalocyanato nickel (tetrabenzotetraazaporphyrin nickel) and oxo-, sulphur- or fluorine-bridged phthalocyanato metal complexes, both to be doped with iodine. Examples of sub-group (b) are cyanophthalocyanato cobalt and pyrazinophthalocyanato iron.

Hanack's general description (pp. 133, 136, 151 and 152) of sub-group (b) is stacked, macrocyclic metal complex polymers, based upon porphyrin or a derivative thereof, which comprise organic bridging ligands containing conjugated pi-electrons allowing electron delocalization along the polymer axis and in which the metal atom is Fe, Ru, Co, Mn or Cr. In accordance with DE-A 3,245,750, another suitable metal atom is Rh. It is with the group of polymers so defined that the present invention is concerned. These polymers will be referred to herein as "intrinsically conductive polymers."

Insolubility or limited solubility with simultaneous complete decomposition of many organic conductors has so far hampered their successful commercialization. Lack of adequate solubility is a particular problem with intrinsically conductive polymers. In order to circumvent such solubility problems, it has been proposed in DE-A 3,421,993 to process particulate superconductors by compression-molding at an extremely elevated pressure. However, since this molding method is to be carried out in an intricate mold of a special construction combining both high pressure and high vacuum technology, this molding method is too complicated for practical application.

It is therefore an object of the present invention to provide suitable solvents for the above-defined group of intrinsically conductive polymers and a processing method for making conductive, hybrid polymer compositions.

SUMMARY OF THE INVENTION

According to the invention, a process is provided for preparing an electrically conductive polymer composition. The process comprises preparing a blend of a solution of a first polymer which is an intrinsically conductive polymer and a second polymer selected from thermosetting, thermoplastic and elastomeric polymers and removing the solvent, the first polymer being employed in a weight ratio to the second polymer of from about 0.005:1 to 3:1, the solution having a solids content of from about 2 to 75 weight percent, and the intrinsically conductive polymer being an electrically conductive, stacked macrocyclic metal complex polymer based upon porphyrin or a derivative thereof which comprises an organic bridging ligand containing conjugated pi-electrons allowing delocalization along the polymer chain and in which the metal atom is Fe, Ru, Rh, Co, Mn or Cr.

DETAILED DESCRIPTION OF THE INVENTION

Suitable solvents that may be employed in the process of this invention are aprotic polar solvents with a low tendency towards nucleophilic substitution. Examples thereof are 2,3-imidazolidanon, hexamethylphosphortriamide, cyclo hexanone, ethylene carbonate, dimethyl acetamide, N-methyl pyridon, N,N'-dimethylpyrimidon sulfolane and trifluoromethane sulphonic acid. Other suitable solvents are sulphuric acid and m-cresol.

In principle, any of the intrinsically conductive polymers described in Hanack et al. can be employed in the process of this invention, provided their conductivity is sufficiently attractive to warrant practical application. These polymers can for easy reference be schematically represented by the formula /-M'-L-/n, in which n is an integer of at least 5, preferably at least 10, L is the organic bridging ligand, M represents the metal atom and the symbol ' denotes the macrocyclic structure surrounding the metal atom arranged perpendicularly to the linear polymer axis. This formula includes all possibilities for linking the metal atoms to the bridging ligands, i.e., 1. by two sigma-bonds,
2. by one sigma-bond and one coordinate bond,
3. by two coordinate bonds.

The preferred metal atoms are iron or cobalt. The preferred bridging ligands are selected from the group cyano, pyrazine, tetrazine, bypyridine, diisocyanobenzene, bypyridylethyne, azide and thiocyano. Preferred macrocyclic structures are porphyrin, tetrabenzoporphyrin, octaethylporphyrin, tetramethylporphyrin, hemiporphyrazin tetraphenyl porphyrin, tetrabenzotetraazaporphyrin phthalocyanine), tetranaphtalo tetraazaporphyrin. Both the bridging ligand and the macrocyclic structure can carry one or more substituents in addition to the ones already listed. Examples of substituted bridging ligands are dicyano tetramethylbenzene, dicyanotetrachlorobenzene, and 2,2'-dimethylbipyridine. Examples of substituted macrocyclic structures are octamethylphthalocyanine, octamethoxyphthalocyanine, hexadecachlorophthalocyanine, and tetranitrophthalocyanine.

Of specific interest are cyanophthalocyanato cobalt polymers in which the phthalocyanine structure carries one single substituent selected from amino, cyano and amidyl derived of an alkane carboxylic acid with 2 to 20 carbon atoms ($=$—NH—CO—CmH2m+1 in which m is 1 to 19). These polymers are novel and as such form part of the present invention. They can be made in a conventional way by condensing phthalic anhydride and nitrophthalic anhydride with ureum in the presence of cobalt chloride, followed by oxidation with molecular oxygen in ethanol and sodiumcyanide to produce the monomeric structure sodium cyanophthalocyanato cobalt. This in its turn is polymerized to cyanocyanophthalocyanine cobalt polymer by refluxing the monomer in aqueous medium. If the nitro-substituent in the condensation reaction product is reduced with hydrogen, an amino substituent is formed which may be reacted into monomer and the desired, mono-amino substituted polymer as set out herein above. Reaction of the amine obtained upon hydrogenation with R—COOH will produce R—CONH— substituted phthalocyanato cobalt, which once again can be converted into the desired monomer and polymer by the procedure set out above. Similar mono-substituted polymers can likewise be synthesized by this route.

The most preferred group of intrinsically conductive polymers comprise phthalocyanato cobalt and phthalocyanato iron polymers in which the bridging ligand is cyano. Another preferred group of conductive polymers are phthalocyanato cobalt and phthalocyanato iron polymers in which the bridging ligand is pyrazine, tetrazine or thiocyano.

In the process of this invention the conductive polymers are employed as solutions in the selected solvent. The solids content (i.e., the content of conductive polymer) is set within the range of from about 2 to 75 weight percent, preferably from about 10 to 35 weight percent. These limits are related to the solubility criteria of the various polymeric compounds in the various solvents in the sense that if a conductive polymer is not sufficiently soluble in a certain solvent to produce a solution with a solids content of at least 2, preferably at least 10 weight percent, then that combination of solvent and conductive polymer is excluded from this invention. Another feature of the chosen solvent is that the decomposition of the conductive polymer is minimal during the time needed to prepare the conductive composite.

For the preparation of the hybrid polymer compositions of the invention various embodiments are possible. The most convenient way is first to prepare a solution of the conductive polymer and then to dissolve or disperse the other polymer into that solution. The reverse procedure may also be adopted. A third possibility is solution blending of previously prepared solutions of each of the two polymers.

Suitable elastomeric polymers for use as the second polymer are ethylene-propylene-diene copolymers, polyisobutene, polybutadiene, neoprene, polyisoprene and styrene-butadiene copolymers, which may be selected from random copolymers or block-copolymers, whether hydrogenated or not. Suitable thermosetting resins are epoxy resins, polyurethane resins, polyester resins, novolak resins and the like. Suitable thermoplastic polymers are polyvinylchloride, teflon, polyacrylates polyvinylacetate, polyvinylalcohol, polymethacrylates, polystyrene, polyamides selected from commercial nylon types, polyaramide (Kevlar or Twalon), polyethylene, polybutene polypropylene, cellulose-acetate and the like.

The conductive hybrid polymer compositions resulting from the process of this invention may be employed as laminates, castings, fiber reinforced articles of manufacture, coatings, paints, lacquers, varnishes, films, sheetings, non-woven fabrics, pipes, tubes, monofilaments, yarns, tires and various moldings including injection-moldings.

By varying the types and content of conductive polymers in the hybrid polymer composition of this invention, end-products having a wide range of conductivities can be prepared.

Conventional methods for processing the hybrid polymer compositions into envisaged end-products usually involve application of heat, as in extrusion, injection-molding, vulcanizing or curing resins with appropriate curing agents. The effect of heat will normally ensure adequate removal of solvent from the hybrid compositions by evaporation. Alternative methods, for example, chemical or physical absorption, to remove solvent may be employed as well. When sulphuric acid is used as the solvent, diffusion of a hybrid polymer solution in water will provide adequate removal of solvent from the polymer composition. As example thereof reference is made to the conventional solution spinning method of a homogeneous polyaramide/H2SO4 system.

EXAMPLE I

Various solvents were employed to dissolve either polymeric cyanophthalocyanato cobalt(III) (ref. i), or polymeric monoaminocyanophthalocyanato cobalt(III) (ref. ii). The solvents were hexamethylphosphortriamide (A), butanon-2 (B), 2,3 dimethylimidazolidanon (C), N-methylpyridon (D), trifluoromethanesulphonic acid (E), and concentrated sulphuric acid (F). The same solvents or dimethyl formamide (G) were employed to disperse or dissolve thermoplastic polymers, thermosetting resins or curing systems. Concentrations of intrinsically conductive polymer (component a) over the other polymer (component b) were varied over 5, 10, 15, 20 and 40 weight percent, calculated on total weight of hybrid polymer composition.

All hybrid compositions were tested for conductivity, the latter was found to be less than $10^{12}$ sigma$^{-1}$.cm$^{-1}$, well below the level of the polymer matrix itself. Table 1 lists the various hybrid compositions that were prepared.

TABLE I

| exp. | comp. a) | comp. b) | solvent for a) | solvent for b) | processing method |
|---|---|---|---|---|---|
| 1 | i | EPIKOTE ®-828, isophorondiamine | A | — | casting |
| 2 | i | EPONOL ® | A | B | coating |
| 3 | i | EPONOL ® | C | B | coating |
| 4 | i | EPONOL ® | D | B | coating |
| 5 | i | EPIKOTE ®-1009 | A | A | coating |
| 6 | i | Polyaramide | E | F | fiber spinning |
| 7 | i | Polyaramide | F | F | fiber spinning |
| 8 | i | Cellulose-triacetate | A | G | filmcasting |
| 9 | ii | EPONOL ® | A | B | coating |
| 10 | ii | EPIKOTE ®-1009 | A | A | coating |

Experiment 1 involved dissolving 0.1 g (i) in 0.6 ml solvent A, followed by dispersing a blend of 0.2 g of EPIKOTE ® 828 and isophorondiamine curing agent (1:1 eq. ratio) into the homogeneous phthalocyanine polymer solution. A casting was made by curing at 80° C. during 0.5 hours, which heating adequately evaporated the solvent.

Experiment 2 involved dissolving 0.1 g in 0.6 ml solvent A, blending with 1.25 ml EPONOL ®, which is 40% wt solution of a condensation product, essentially free from epoxy groups, of EPIKOTE ®-828 and an equivalent amount of dihydroxydiphenylpropane in solvent C, and coating a zinc surface on a non-conductive substrate. Curing was effected by heating at 130° C during 0.5 hrs, and curing proceeded via intramolecular condensation of the hydroxyl-groups, water so formed and solvent being evaporated simultaneously.

Experiments 3 and 4 were carried out in analogy to experiment 2.

Experiment 5 involved first dissolving 0.1 g (i) in 1 ml A, then dissolving 1 g EPIKOTE®-1009 in 2 ml A, blending the two solutions to form one homogeneous solution and then proceeding to form a coating as described in experiment 2.

In experiments 6 and 7, 0.4 g polyamide was dissolved in 28 g concentrated sulphuric acid under nitrogen atmosphere. 0.4 g of i was dissolved in 4 g concentrated sulphuric acid. Both solutions were mixed under nitrogen. A fiber was produced by injecting the solution into water at room temperature, the fiber was dried at 50° C during 24 hours.

Experiment 8 involved dissolving 10 g cellulose triacetate in 200 ml G. The solution was mixed with 2 ml of a solution of 2.5 g of i in 100 ml A. A film was cast on a glass plate and the film was dried at 50° C during 24 hours.

Experiments 9 and 10 were carried out in analogy to experiments 2 and 4, respectively.

EXAMPLE II

Preparation of novel conductive polymers.

a) 3-nitrophthalic anhydride and an equimolar amount of phthalic anhydride were condensed with COC12 and urea. The reaction product was oxidized by passing an oxygen stream through a solution of the product in ethanol under reflux in the presence of sodium cyanide. The resulting monomer was polymerized by refluxing in water during 24 hours. Upon analysis a substituted cyanophthalocyanato cobalt (III) polymer carrying on average one —CN substituent per phthalocyanine ring appeared to have been formed upon polymerization.

b) Following condensation with COC12 and urea as set out in IIa above, the reaction product was hydrogenated in the presence of a palladium catalyst for converting the nitro substituent into an amine group. Then the preparation of monomer and polymer as disclosed in IIa above was closely followed. The same polymer as disclosed in IIa was found, the only difference being the presence of on average one amino group per ring instead of one nitril group per ring.

c) Following condensation with COC12 and urea as set out in IIa above and hydrogenation as set out in IIb, the amine groups were reacted with C13H27COOH to form a corresponding group C13H27 CONH—. The same group was found as single substituent per phthalocyanine ring made along analogous preparation of monomer and polymer. The analysis of the polymers involved PCME determination, IR, proton and C13NMR analysis.

EXAMPLE III

Preparation of novel monomeric compound.

Cobalt (II) phthalocyanine was condensed with NaCN under reflux in ethanol while passing an oxygen stream through the solution. The reaction product was recovered from the solution and dried during 24 hours in vacuum at 80° C. Upon PCME, IR, proton and C13NMR analysis the product was found to comprise sodium as cation and HO—Co'—CN as monovalent anion. The yield of the monomeric compound was 60–95% (of theoretical) calculated on cobalt phthalocyanine starting material.

What is claimed is:

1. A process for preparing an electrically conductive polymer composition which process comprises:
    preparing a blend of (a) a solution of an intrinsically conductive polymer in a solvent selected from the group consisting of 2,3-imidazolidanon, hexamethylphosphortriamide, cyclohexanone, ethylene carbonate, dimethyl acetamide, N-methyl pyridon, N,N'-dimethylpyrimidon sulfolane, trifluoromethane sulfonic acid, concentrated sulfuric acid and m-cresol and (b) a second polymer selected from thermosetting, thermoplastic and elastomeric polymers, and
    removing the solvent,
    the intrinsically conductive polymer being employed in a weight ratio to the second polymer of from about 0.005:1 to 3:1, the solution of the intrinsically conductive polymer having a solids content of from about 2 to 75 weight percent, and the intrinsically conductive polymer being an electrically conductive, stacked macrocyclic metal complex polymer based upon porphyrin or a derivative thereof which comprises an organic bridging ligand containing conjugated pi-electrons allowing delocalization along the polymer chain and in which the metal atom is selected from Fe, Ru, Rh, Co, Mn and Cr.

2. The process of claim 1 in which the metal atom is selected from Fe and Co.

3. The process of claim 1 in which the macrocyclic structure is phthalocyanine.

4. The process of claim 1 in which the organic bridging ligand is selected from cyano, pyrazine, tetrazine, bypyridine, bipyridylethyne, thiocyanide, azide and diisocyanobenzene.

5. The process of claim 1 in which the thermosetting polymer is an epoxy resin.

6. The process of claim 1 in which the thermoplastic polymer is a polyolefin.

7. The process of claim 1 in which the thermoplastic polymer is a polyaramide.

8. The process of claim 1 in which the elastomeric copolymer is a styrene/butadiene copolymer.

9. The process of claim 1 in which the weight ratio of intrinsically conductive polymer to second polymer in the conductive polymer composition is from about 0.02:1 to 0.25:1.

10. The process of claim 1 in which the solvent is selected from 2,3-imidazolidanon, hexamethylphosphortriamide, N-methyl pyridon, trifluoromethane sulfonic acid, and concentrated sulfuric acid.

11. The process of claim 9 which the solids content is from about 10 to 35 weight percent.

* * * * *